(12) United States Patent
Lee et al.

(10) Patent No.: US 12,244,407 B2
(45) Date of Patent: Mar. 4, 2025

(54) OPERATION APPARATUS FOR FIBER NETWORK AND CONTROL METHOD THEREOF

(71) Applicant: KOREA INSTITUTE OF SCIENCE & TECHNOLOGY INFORMATION, Daejeon (KR)

(72) Inventors: Chan Kyun Lee, Daejeon (KR); Won Hyuk Lee, Sejong-si (KR)

(73) Assignee: KOREA INSTITUTE OF SCIENCE & TECHNOLOGY INFORMATION, Daejeon (KR)

( * ) Notice: Subject to any disclaimer, the term of this patent is extended or adjusted under 35 U.S.C. 154(b) by 265 days.

(21) Appl. No.: 17/945,192

(22) Filed: Sep. 15, 2022

(65) Prior Publication Data

US 2023/0283397 A1    Sep. 7, 2023

(30) Foreign Application Priority Data

Mar. 2, 2022   (KR) .......................... 10-2022-0026765

(51) Int. Cl.
*H04J 14/04*   (2006.01)
*H04J 14/02*   (2006.01)

(52) U.S. Cl.
CPC ................................ *H04J 14/0227* (2013.01)

(58) Field of Classification Search
CPC .... H04J 14/0227; H04J 14/04; H04J 14/0257; H04J 14/052; H04L 45/62; H04B 10/27
See application file for complete search history.

(56) References Cited

U.S. PATENT DOCUMENTS

| | | | |
|---|---|---|---|
| 4,873,716 A * | 10/1989 | Brady ............... | H04Q 11/0428 |
| | | | 379/373.05 |
| 9,065,582 B2 * | 6/2015 | Barry .................... | H04L 49/351 |
| 12,034,487 B2 * | 7/2024 | Sakamoto ............ | H04J 14/052 |
| 2005/0089327 A1 | 4/2005 | Ovadia et al. | |
| 2008/0165878 A1 * | 7/2008 | Kajihara ............... | H04L 1/0631 |
| | | | 375/264 |
| 2009/0304380 A1 * | 12/2009 | Sadananda ........ | H04Q 11/0062 |
| | | | 398/79 |
| 2016/0218840 A1 * | 7/2016 | Li ......................... | H04L 5/0094 |
| 2020/0266894 A1 | 8/2020 | Shen et al. | |
| 2022/0256598 A1 * | 8/2022 | Kusashima ......... | H04W 74/002 |
| 2022/0337350 A1 * | 10/2022 | Fu ......................... | H04L 5/0096 |
| 2023/0155677 A1 * | 5/2023 | Acharjee ............... | G06N 20/00 |
| | | | 398/25 |
| 2023/0283397 A1 * | 9/2023 | Lee ..................... | H04J 14/0227 |
| 2024/0235683 A1 * | 7/2024 | Inuzuka ............ | H04Q 11/0005 |
| 2024/0244595 A1 * | 7/2024 | Wang ................... | H04L 5/0094 |

FOREIGN PATENT DOCUMENTS

JP          2018-101839          6/2018

OTHER PUBLICATIONS

Korean Office Action dated Jan. 10, 2024 issued in Application No. 10-2022-0026765.

\* cited by examiner

*Primary Examiner* — Tanya T Motsinger
(74) *Attorney, Agent, or Firm* — KED & ASSOCIATES, LLP (57) ABSTRACT

The present disclosure relates to a fiber network operation apparatus for providing a method of determining a physical path in consideration of network performance and resource efficiency in a space division multiplexing-based fiber network and allocating optical resources according thereto, and an operation method thereof.

13 Claims, 9 Drawing Sheets

Transmission path: a→b→d→f
(Allocated wavelength, Allocated core): ($\lambda_1$, $c_1$)

[Fiber network operation apparatus]

OPERATION APPARATUS FOR FIBER NETWORK AND CONTROL METHOD THEREOF

CROSS-REFERENCE TO RELATED APPLICATION(S)

This application is based on and claims priority under 35 U.S.C. 119 to Korean Patent Application No. 10-2022-0026765, filed on Mar. 2, 2022, in the Korean Intellectual Property Office, the disclosure of which is herein incorporated by reference in its entirety.

BACKGROUND OF THE INVENTION

1. Field of the Invention

The present disclosure relates to a method of determining a physical path in consideration of network performance and resource efficiency in a space division multiplexing-based fiber network and allocating optical resources according thereto.

2. Description of the Prior Art

Space division multiplexing (SDM) technology in a fiber network is a multiplexing technique for increasing the transmission capacity of an optical fiber by installing a plurality of cores in one optical fiber or accommodating a plurality of transmission modes in one core.

In particular, multi-core fiber (MCF) technology in which a plurality of cores is installed in one optical fiber or multi-mode fiber (MMF) technology in which a plurality of optical transmission modes is accommodated in one optical fiber core may increase the transmission capacity of an existing single-core single-mode optical fiber in proportion to the number of cores and the number of transmission modes.

Since space division multiplexing technology uses a limited number of cores or modes, it is essential to distribute optical resources in consideration of resource efficiency in order to effectively handle increasing network traffic.

On the other hand, in a multi-core or multi-mode optical fiber, inter-core or inter-mode interference may occur, thereby reducing network performance.

Therefore, configuration of paths and core/mode optical resource allocation are very important issues that influence the performance of space division multiplexing-based fiber networks.

However, in the field of space division multiplexing, although research and development are currently being conducted focusing on optical device hardware technology, software approaches such as network resource allocation algorithms are insufficient.

SUMMARY OF THE INVENTION

The present disclosure has been made in view of the above circumstances, and an aspect of the present disclosure is to provide a method of determining a physical path in consideration of network performance and resource efficiency in a space division multiplexing-based fiber network and allocating optical resources according thereto.

In order to attain the objective, a fiber network operation apparatus according to an embodiment of the present disclosure may include a determination unit configured to determine, upon occurrence of a flow in which an input node and an output node are defined on a space division multiplexing-based fiber network, a physical path supporting connection of the flow, and an allocation unit configured to allocate, in relation to an optical resource that is a combination of a wavelength and a core identified to be allocable to the physical path, optical resources that meet predefined resource allocation conditions to the physical path.

Specifically, if there are two or more physical paths, the allocation unit may be configured to identify optical resources allocable to a specific physical path on the basis of shortest path priority, among the two or more physical paths, and, if there is no optical resource allocable to the specific physical path, identify optical resources allocable to a physical path adjacent and subsequent to the specific physical path.

Specifically, the allocation unit may be configured to calculate the magnitude of interference of each of the optical resources allocable to the physical path due to optical resources previously allocated to respective links constituting the physical path according to the resource allocation conditions and, as a result of the calculation, allocate a specific optical resource, which has the smallest magnitude of interference, to the physical path.

Specifically, if there is a specific optical resource that has the highest number of allocations, among optical resources previously allocated to links connected to respective nodes on the physical path, and is not allocated to the respective links constituting the physical path according to the resource allocation conditions, the allocation unit may be configured to allocate the specific optical resource to the physical path.

Specifically, if there are two or more physical paths, the allocation unit may be configured to identify whether or not there is the specific optical resource for a specific physical path on the basis of shortest path priority, among the two or more physical paths, and, if there is no specific optical resource, identify whether or not there is the specific optical resource for a physical path adjacent and subsequent to the specific physical path.

Specifically, the determination unit may be configured to determine a physical path by giving priority to transmission of qubits in the case where simultaneous transmission of optical data and qubits is required on the space division multiplexing-based fiber network, and allocate an optical resource having a combination of at least some cores in which an optical amplifier is not installed, among all cores, to the physical path in the allocating.

In order to attain the objective, an operation method of a fiber network operation apparatus according to an embodiment of the present disclosure may include determining, upon occurrence of a flow in which an input node and an output node are defined on a space division multiplexing-based fiber network, a physical path supporting connection of the flow, and, in relation to an optical resource that is a combination of a wavelength and a core identified to be allocable to the physical path, allocating optical resources that meet predefined resource allocation conditions to the physical path.

Specifically, the allocating may include, if there are two or more physical paths, identifying optical resources allocable to a specific physical path on the basis of shortest path priority, among the two or more physical paths, and, if there is no optical resource allocable to the specific physical path, identifying optical resources allocable to a physical path adjacent and subsequent to the specific physical path.

Specifically, the allocating may include calculating the magnitude of interference of each of the optical resources allocable to the physical path due to optical resources previously allocated to respective links constituting the physical path according to the resource allocation conditions and, as a result of the calculation, allocating a specific optical resource, which has the smallest magnitude of interference, to the physical path.

Specifically, the allocating may include, if there is a specific optical resource that has the highest number of allocations, among optical resources previously allocated to links connected to respective nodes on the physical path, and is not allocated to the respective links constituting the physical path according to the resource allocation conditions, allocating the specific optical resource to the physical path.

Specifically, the allocating may include, if there are two or more physical paths, identifying whether or not there is the specific optical resource for a specific physical path on the basis of shortest path priority, among the two or more physical paths and, if there is no specific optical resource, identifying whether or not there is the specific optical resource for a physical path adjacent and subsequent to the specific physical path.

Specifically, a physical path may be determined by giving priority to transmission of qubits in the determining in the case where simultaneous transmission of optical data and qubits is required on the space division multiplexing-based fiber network, and an optical resource having a combination of at least some cores in which an optical amplifier is not installed, among all cores, may be allocated to the physical path in the allocating.

Accordingly, a fiber network operation apparatus of the present disclosure and an operation method thereof enable determination of a physical path and allocation of optical resources by preferentially considering interference between optical resources in the space division multiplexing-based fiber network, resource efficiency of a fiber network in consideration of the future demand for optical resources, and furthermore, transmission of qubits, which provides the effects of improving performance of the fiber network and reducing operating cost thereof.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Hereinafter, preferred embodiments of the present disclosure will be described with reference to the accompanying drawings.

An embodiment of the present disclosure provides an operation technique of a space division multiplexing-based fiber network.

Space division multiplexing (SDM) technology in a fiber network is a multiplexing technique for increasing the transmission capacity of an optical fiber by installing a plurality of cores in one optical fiber or accommodating a plurality of transmission modes in one core.

In particular, multi-core fiber (MCF) technology in which a plurality of cores is installed in one optical fiber or multi-mode fiber (MMF) technology in which a plurality of optical transmission modes is accommodated in one optical fiber core may increase the transmission capacity of an existing single-core single-mode optical fiber in proportion to the number of cores and the number of transmission modes.

However, although the space division multiplexing technology is being applied based on submarine cables of a backbone network in order to effectively handle the explosion of network traffic, distribution of optical resources considering resource efficiency is essential to effectively process significantly increasing network traffic because it uses a limited number of cores or modes.

In this regard, in a multi-core or multi-mode optical fiber, inter-core or inter-mode interference may occur, thereby reducing network performance.

Therefore, configuration of paths and core/mode optical resource allocation are very important issues that influence the performance of space division multiplexing-based fiber networks However, in the field of space division multiplexing, although research and development are currently being conducted focusing on optical device hardware technology, software approaches such as network resource allocation algorithms are insufficient.

In a fiber network, a network path from a specific input node to an output node must be determined for a service requiring optical fiber communication, and optical resources must be allocated and transmitted.

In the case where a space division multiplexing network is configured using a multi-core optical fiber, an optical transmission core for optical transmission must be allocated.

Figure 1:
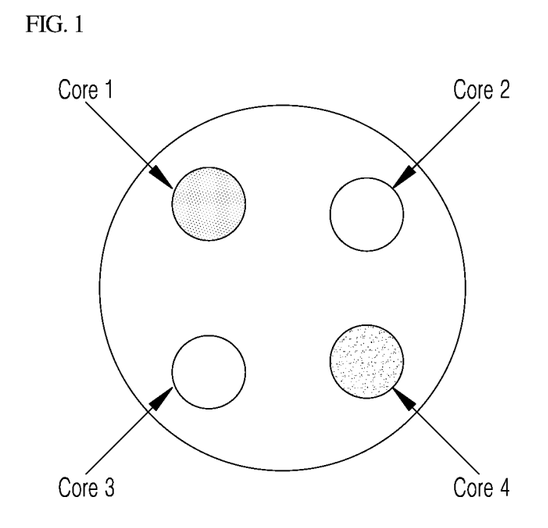
FIG. 1 is an exemplary diagram illustrating an optical fiber according to an embodiment of the present disclosure.

For example, in a multi-core optical fiber including four cores (Core 1 to 4) as shown in FIG. 1, a method may be considered in which Core 1 is allocated for transmission of a specific service and in which Core 4 having the minimum interference with Core 1 is used for subsequent services.

Similarly, in the case where a space division multiplexing network is configured using a multi-mode optical fiber, an optical transmission mode must be allocated in consideration of the interference situation.

However, since the number of cores and the number of modes of the space division multiplexing-based fiber network are limited, using the same as efficiently as possible may reduce the operating cost of the space division multiplexing network, so its application is a realistic essential technology.

Figure 2:
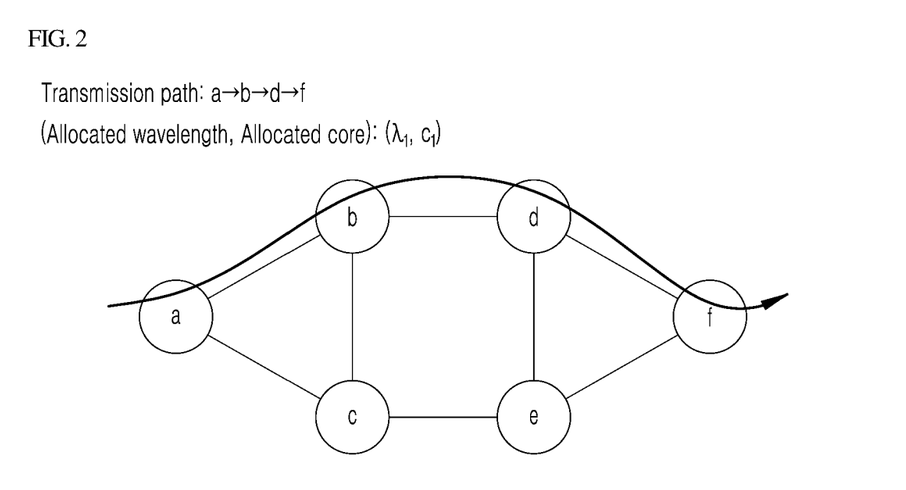
FIG. 2 is an exemplary diagram of a space division multiplexing-based fiber network structure according to an embodiment of the present disclosure.

For example, in a space division multiplexing-based fiber network structure including space division multiplexing nodes and space division multiplexing links as shown in FIG. 2, if a service to be transmitted from node "a" to node "f" occurs, a flow for the corresponding service may be connected by a path passing through nodes "a", "b", "d", and "f."

This may be understood as an example in which wavelength resource 1 ($\lambda 1$) and core resource 1 (c1) are allocated for the service in the case where both wavelength division multiplexing (WDM) of a fiber network and space division multiplexing using a multi-core optical fiber are used.

However, if different cores are supported in one optical fiber or different transmission modes are supported in one core in such a space division multiplexing-based fiber network, inter-core or inter-mode interference may occur, thereby reducing network performance, so a method of efficiently determining a physical path and allocating optical resources is required.

Accordingly, an embodiment of the present disclosure is intended to newly propose a method of determining a physical path in consideration of network performance and resource efficiency in a space division multiplexing-based fiber network and allocating optical resources according thereto.

Figure 3:
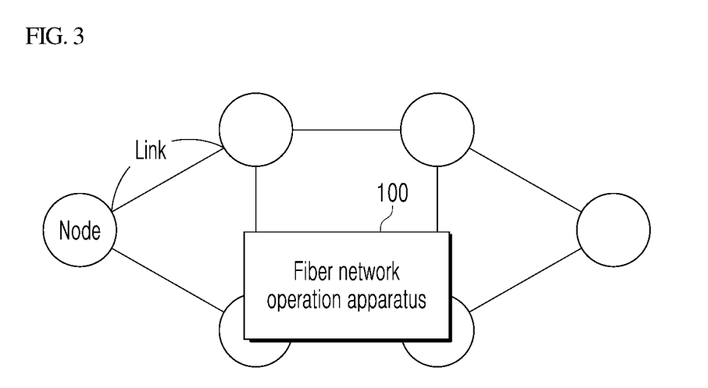
FIG. 3 is an exemplary diagram illustrating a space division multiplexing-based fiber network operating environment according to an embodiment of the present disclosure.

In this regard, FIG. 3 exemplarily illustrates a space division multiplexing-based fiber network operating environment according to an embodiment of the present disclosure.

As shown in FIG. 3, the space division multiplexing-based fiber network operating environment according to an embodiment of the present disclosure may be configured to include a fiber network operation apparatus 100 for calculating a physical path and allocating optical resources in order to support a flow between an input node and an output node in a space division multiplexing-based fiber network having a plurality of nodes and a link structure connecting the respective nodes.

Such a fiber network operation apparatus 100 may be a specific node designated in the fiber network or may be implemented as a device separate from the fiber network.

As described above, in the case where the fiber network operation apparatus 100 is implemented as a device separate from the fiber network, it may be implemented in the form of a server. The server may be implemented in the form of, for example, a web server, a database server, a proxy server, etc., and one or more of a network load dispersion mechanism or a variety of software that enables a service device to operate on the Internet or another network may be installed therein, so that the server may be implemented as a computerized system therethrough.

In the space division multiplexing-based fiber network operating environment according to an embodiment of the present disclosure, it is possible to determine a physical path in consideration of resource efficiency and allocate optical resources according thereto through the above-described configuration, and hereinafter, the configuration of the fiber network operation apparatus 100 to realize the same will be described in more detail.

Figure 4:
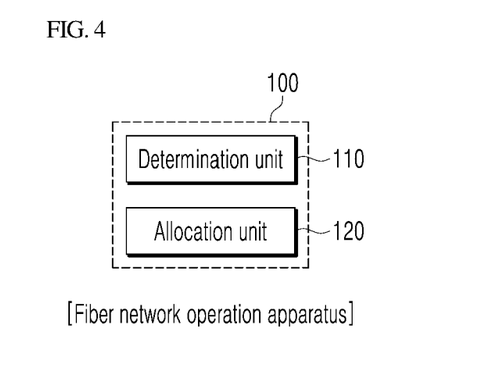
FIG. 4 is a schematic configuration diagram of a fiber network operation apparatus according to an embodiment of the present disclosure.

FIG. 4 shows schematic configuration of a fiber network operation apparatus 100 according to an embodiment of the present disclosure.

As shown in FIG. 4, a fiber network operation apparatus 100 according to an embodiment of the present disclosure may be configured to include a determination unit 110 configured to determine a physical path and an allocation unit 120 configured to allocate optical resources.

The entire configuration of the fiber network operation apparatus 100 including the determination unit 110 and the allocation unit 120 or at least some thereof may be implemented in the form of a hardware module, a software module, or a combination of a hardware module and a software module.

Here, the software module may be understood as, for example, instructions executed by a processor configured to control operations in the fiber network operation apparatus 100, and these instructions may be stored in a memory in the fiber network operation apparatus 100.

The fiber network operation apparatus 100 according to an embodiment of the present disclosure may determine a physical path in consideration of resource efficiency and allocate optical resources according thereto through the above-described configuration. Hereinafter, a more detailed description of the configuration of the fiber network operation apparatus 100 to realize the same will be continued.

Although space division multiplexing to be mentioned below is assumed to be implemented based on a multi-core optical fiber for convenience of description, the disclosure is not limited thereto, and space division multiplexing may also be implemented through a multi-mode optical fiber.

In addition, in an embodiment of the present disclosure, interference between optical resources, the efficiency of optical resources, and furthermore, transmission of qubits will be considered as respective embodiments for determination of a physical path and allocation of optical resources, and the respective embodiments will be separately described.

First, respective configurations in the fiber network operation apparatus 100 for considering interference between optical resources in an embodiment of the present disclosure will be described as follows.

The determination unit 110 performs a function of determining a physical path between an input node and an output node.

More specifically, upon the occurrence of a flow in which an input node and an output node are defined on the space division multiplexing-based fiber network, the determination unit 110 determines a physical path supporting connection of the corresponding flow.

The determination unit 110 may determine, as respective physical paths, different combinations of nodes and links between the nodes, which are capable of interconnecting an input node and an output node on the fiber network.

For example, when flow (s->d) in which an input node "s" and an output node "d" are arbitrarily defined occurs on a space division multiplexing-based fiber network, there may be multiple physical paths of the network connecting the given flow (s->d).

In an embodiment of the present disclosure, a total of N different physical paths may be calculated, and the ith path may be defined as ps->d(i) ($1 \leq i \leq N$).

Here, N may be variously determined depending on the operation of the fiber network, and in particular, since it may take much time to calculate the physical path for too large N in the case of a large sized network, an appropriate selection thereof is required.

In addition, ps->d(i) may be defined based on the priority of a shortest path using, for example, Dijkstra's shortest path algorithm in calculating the physical path.

The allocation unit 120 performs a function of allocating an optical resource to a physical path.

More specifically, when a physical path supporting a flow between the input node and the output node is determined, the allocation unit 120 allocates an optical resource that meets predefined resource allocation conditions to the physical path.

If there are two or more physical paths, the allocation unit 120 may identify optical resources allocable to a specific physical path on the basis of the shortest path priority, among the two or more physical paths, and if there is no optical resource allocable to the specific physical path, the allocation unit 120 may identify optical resources allocable to a physical path adjacent and subsequent to the specific physical path.

Here, the optical resources allocable to a specific physical path may be understood as, for example, the remaining optical resources, excluding optical resources previously allocated to the respective links constituting the corresponding physical path, among all optical resources.

Furthermore, when optical resources allocable to a specific physical path are identified, the allocation unit 120 may calculate, according to the resource allocation conditions, the magnitude of interference of each of the optical resources allocable to the corresponding physical path due to the optical resources previously allocated to the respective links constituting the corresponding physical path and, as a result of the calculation, allocate a specific optical resource, which has the smallest magnitude of interference, to the corresponding physical path.

The above configuration will be described again as follows with reference to the previous example.

It starts to be identified from the smallest "i" whether or not there is an optical resource ($\lambda$, c) that is a combination of a wavelength ($\lambda$) and a core (c) allocable to ps->d(i).

If there are optical resources ($\lambda$, c) allocable to a specific ps->d(i), it is possible to calculate an optical resource ($\lambda^*$, c*) having the smallest interference due to the optical resources ($\lambda$, c) that were previously allocated to the respective links constituting ps->d(i), among all the allocable optical resources ($\lambda$, c), and allocate the same to ps->d(i).

Here, the degree of interference may be calculated using a theoretical formula or may be pre-configured in the form of a table through an inter-core interference experiment depending on optical fiber characteristics.

If there is no optical resource ($\lambda$, c) allocable to the specific ps->d(i), the resource allocation for the path ps->d(i) is abandoned, and the above process repeats for a path ps->d(i+1).

The process repeats until "i" becomes N, and if there is no allocable optical resource ($\lambda$, c) even for the path ps->d(N), it is impossible to connect the corresponding flow (s->d).

Consequently, in the case of a method in consideration of interference between optical resources in an embodiment of the present disclosure, it is possible to reduce interference in the space division multiplexing network through a method of identifying optical resources allocable to the flow and allocating, among them, a resource having the smallest interference due to the previously assigned optical resources.

Next, respective configurations in the fiber network operation apparatus 100 for considering the efficiency of optical resources in an embodiment of the present disclosure will be described as follows.

The determination unit 110 performs a function of determining a physical path between an input node and an output node.

More specifically, upon the occurrence of a flow in which an input node and an output node are defined on the space division multiplexing-based fiber network, the determination unit 110 determines a physical path supporting connection of the corresponding flow.

The determination unit 110 may determine, as respective physical paths, different combinations of nodes and links between the nodes, which are capable of interconnecting an input node and an output node on the fiber network.

For example, when flow (s->d) in which an input node "s" and an output node "d" are arbitrarily defined occurs on a space division multiplexing-based fiber network, there may be multiple physical paths of the network connecting the given flow (s->d).

In an embodiment of the present disclosure, a total of N different physical paths may be calculated, and the ith path may be defined as ps->d(i) (1≤i≤N).

Here, N may be variously determined depending on the operation of the fiber network, and in particular, since it may take much time to calculate the physical path for too large N in the case of a large sized network, an appropriate selection thereof is required.

In addition, ps->d(i) may be defined based on the priority of a shortest path using, for example, Dijkstra's shortest path algorithm in calculating the physical path.

The allocation unit 120 performs a function of allocating an optical resource to a physical path.

More specifically, when a physical path supporting a flow between the input node and the output node is determined, the allocation unit 120 allocates an optical resource that meets predefined resource allocation conditions to the physical path.

In this case, according to the resource allocation conditions, if there is a specific optical resource that has the highest number of allocations and is not allocated to respective links constituting the corresponding physical path, among the optical resources previously allocated to the links connected to the respective nodes on the physical path, the allocation unit 120 may allocate the specific optical resource to the physical path.

If there are two or more physical paths, the allocation unit 120 may identify whether or not there is the specific optical resource for a specific physical path on the basis of the shortest path priority, among the two or more physical paths, and if there is no specific optical resource, the allocation unit 120 may identify whether or not there is the specific optical resource for a physical path adjacent and subsequent to the specific physical path.

The above configuration will be described in more detail as follows with reference to the previous example.

Identification of optical resources ($\lambda$, c) previously allocated to all links connected to the nodes constituting ps->d(i) starts from the smallest "i", thereby calculating the most frequently allocated optical resource ($\lambda^*$, c*).

If the calculated optical resource ($\lambda^*$, c*) is able to be allocated to the current ps->d(i), the corresponding resource is allocated.

However, if the calculated optical resource ($\lambda^*$, c*) is previously allocated to any link in the path ps->d(i), the corresponding optical resource ($\lambda^*$, c*) is unable to be allocated to ps->d(i), so the resource allocation for the path ps->d(i) is abandoned, and the above process repeats for the path corresponding to ps->d(i+1).

This process repeats until "i" becomes N, and if there is no combination ($\lambda$, c) allocable even to the path ps->d(N), it is impossible to connect the corresponding flow (s->d).

Hereinafter, in order to help the understanding of a method for considering the efficiency of an optical resource in an embodiment of the present disclosure, an example will be further described with reference to the drawings.

Figure 5:
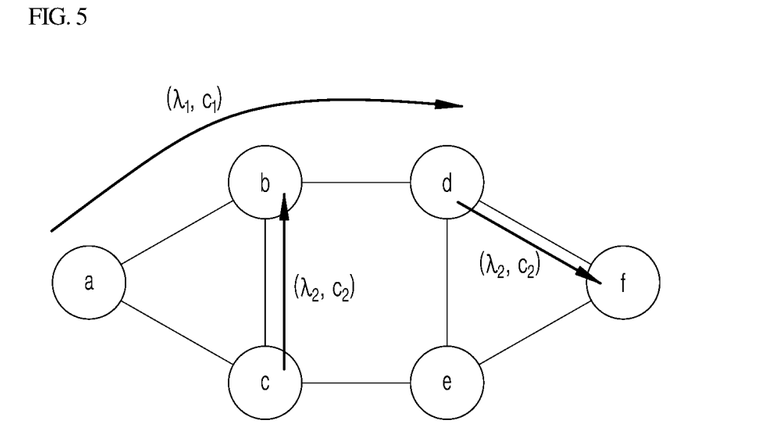
FIG. 5 is an exemplary diagram of a fiber network structure illustrating the efficiency of an optical resource according to an embodiment of the present disclosure.

For example, as in FIG. 5, it may be assumed that flow (a->d) is connected through a path "a and b to d" and has an optical resource (λ1, c1) allocated thereto, that flow (c->b) is connected through a path "c to b" and has an optical resource (λ2, c2) allocated thereto, and flow (d->f) is connected through a path "d to f" and has an optical resource (λ2, c2) allocated thereto.

In this case, if a request for connection of the flow (b->d) occurs, a total of N physical paths connecting the nodes "b" and "d" is calculated, and pb->d(1) is calculated as "b to d" when utilizing the shortest path algorithm.

Furthermore, optical resources (λ, c) previously allocated to all links connected to the nodes "b" and "d" are identified, and a most frequently used optical resource (λ*, c*) among them is calculated.

In the above example, since the optical resource (λ2, c2) is used twice and the optical resource (λ1, c1) is used once for the links connected to the nodes "b" and "d", the most frequently used optical resource (λ*, c*) is calculated as (λ2, c2).

Therefore, the flow (b->d) is connected by allocating the optical resource (λ2, c2) to the path "b to d".

Thereafter, if a request for connection of flow (c->f) occurs and the path thereof is calculated as "c, b, and d to f", the remaining optical resources, excluding (λ1, c1) and (λ2, c2), among all the optical resources, may be allocated to the corresponding path.

However, if any (λx, cy) other than the optical resource (λ2, c2) is allocated in response to the request of the flow (b->d), the optical resources allocable to the path "c, b, and d to f" of the flow (c->f) may be calculated as one of the remaining optical resources, excluding (λ1, c1), (λ2, c2), and (λx, cy).

Consequently, in the case of a method in consideration of the efficiency of optical resources in an embodiment of the present disclosure, it is possible to achieve efficiency of space division multiplexing resources by ensuring a high degree of freedom for optical resources to be allocated to a new flow through a method of identifying optical resources allocable to the flow and allocating the most frequently used optical resource that is a previously assigned optical resource among them.

Next, respective configurations in the fiber network operation apparatus 100 for considering transmission of qubits in an embodiment of the present disclosure will be described as follows.

Before describing, in a space division multiplexing-based fiber network according to an embodiment of the present disclosure, it is assumed that optical data and qubits are able to be simultaneously transmitted through one optical fiber from the viewpoint of multiplexing various services requiring optical transmission.

The determination unit 110 performs a function of determining a physical path between an input node and an output node.

More specifically, upon the occurrence of flows in which an input node and an output node are defined for simultaneous transmission of optical data and qubits on the space division multiplexing-based fiber network, the determination unit 110 determines a physical path supporting connection of the corresponding flow by giving priority to the transmission of qubits.

In this case, the determination unit 110 may determine, as respective physical paths for transmission of qubits, different combinations of nodes and links between the nodes, which are capable of interconnecting an input node and an output node on the fiber network.

In this regard, when a flow in which an input node and an output node are arbitrarily defined occurs on a space division multiplexing-based fiber network, there may be a plurality of physical paths of the network connecting the given flow.

The number of physical paths may be variously determined depending on the operation of the fiber network. However, if the network is large, the number of physical paths also increases according thereto, which may consume much time for calculation thereof, so an appropriate selection is required.

In addition, allocation of optical resources may be considered based on the priority of a shortest path using, for example, Dijkstra's shortest path algorithm in calculating the physical path.

Prioritizing transmission of qubits as described above when simultaneous transmission of optical data and qubits occurs in the space division multiplexing-based fiber network is due to the fact that the secret key rate (SKR) performance of quantum key distribution (QKD) utilizing qubits is greatly affected by the transmission distance of a qubit.

The allocation unit 120 performs a function of allocating an optical resource to a physical path.

More specifically, when a physical path supporting a flow between the input node and the output node is determined for transmission of qubits, the allocation unit 120 allocates an optical resource that meets predefined resource allocation conditions to the physical path.

In this case, the allocation unit 120 may allocate a specific optical resource that meets the resource allocation conditions, among the optical resources having a combination of at least some cores in which an optical amplifier is not installed among all the cores, to the corresponding physical path.

The resource allocation conditions may be understood as a criterion for minimizing the interference between optical resources and a criterion for considering the efficiency of the optical resources described above as separate embodiments.

Allocating at least some cores in which an optical amplifier is not installed in allocation of the optical resources for transmission of qubits as described above is due to the fact that the optical amplifier is unable to be used for transmission of qubits due to the non-replicable characteristic of qubits.

Figure 6:
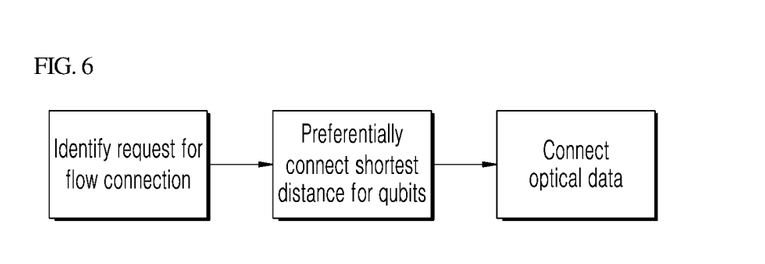
FIG. 6 is an exemplary diagram illustrating a qubit transmission method according to an embodiment of the present disclosure.

As a result, in a method for considering transmission of qubits in an embodiment of the present disclosure, for the case where multiplexing is required in a space division multiplexing-based fiber network due to the occurrence of simultaneous transmission of optical data and qubits, it is possible to consider a method of identifying a flow connection request list shown in, for example, FIG. 6, allocating optical resources by configuring the shortest path with the priority of transmission of qubits, among them, and then allocating optical resources by configuring a path for optical data.

As described above, according to the configuration of the fiber network operation apparatus 100 according to an embodiment of the present disclosure, it is possible to improve the performance of the fiber network by minimizing interference between optical resources when allocating optical resources in the space division multiplexing-based fiber network. In addition, it is possible to attain resource efficiency of the space division multiplexing network through a method that guarantees a high degree of freedom in resource allocation for future demand, among the allocable optical resources in the space division multiplexing-based fiber network, thereby reducing network costs. In addition, it is possible to expand the utility of the network by ensuring efficient transmission of qubits in consideration of the unique characteristics of simultaneous transmission of optical data and qubits in the space division multiplexing-based fiber network.

Figure 7:
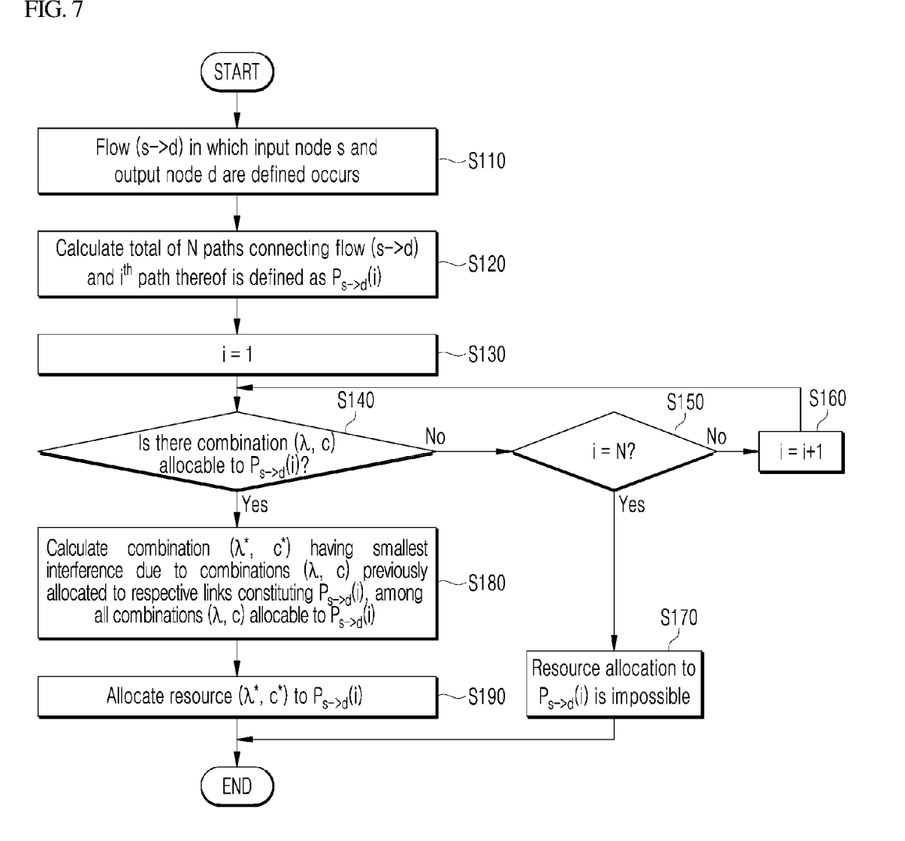
FIGS. 7 to 9 are flowcharts illustrating a method of operating a fiber network operation apparatus according to an embodiment of the present disclosure.

Hereinafter, an operation method of the fiber network operation apparatus 100 for considering interference between optical resources in an embodiment of the present disclosure will be described with reference to FIG. 7.

First, the determination unit 110, upon the occurrence of a flow in which an input node and an output node are defined on a space division multiplexing-based fiber network, determines a physical path supporting connection of the corresponding flow (S110 to S130).

In this case, the determination unit 110 may determine, as respective physical paths, different combinations of nodes and links between the nodes, which are capable of interconnecting an input node and an output node on the fiber network.

That is, when flow (s->d) in which an input node "s" and an output node "d" are arbitrarily defined occurs on a space division multiplexing-based fiber network, there may be multiple physical paths of the network connecting the given flow (s->d).

In this regard, in an embodiment of the present disclosure, a total of N different physical paths may be calculated, and the ith path may be defined as ps->d(i) (1≤i≤N).

Here, N may be variously determined depending on the operation of the fiber network, and in particular, since it may take much time to calculate the physical path for too large N in the case of a large sized network, an appropriate selection thereof is required.

In addition, ps->d(i) may be defined based on the priority of a shortest path using, for example, Dijkstra's shortest path algorithm in calculating the physical path.

Furthermore, when the physical path supporting the flow between the input node and the output node is determined, the allocation unit 120 identifies whether or not there are optical resources allocable to the physical path (S140 to S170), In this case, if there are two or more physical paths, the allocation unit 120 may identify optical resources allocable to a specific physical path on the basis of the shortest path priority, among the two or more physical paths, and if there is no optical resource allocable to the specific physical path, the allocation unit 120 may identify optical resources allocable to a physical path adjacent and subsequent to the specific physical path.

Here, the optical resources allocable to a specific physical path may be understood as, for example, the remaining optical resources, excluding optical resources previously allocated to the respective links constituting the corresponding physical path, among all optical resources.

That is, it starts to be identified from the smallest "i" whether or not there is an optical resource ($\lambda$, c) that is a combination of a wavelength ($\lambda$) and a core (c) allocable to ps->d(i).

If there is no optical resource ($\lambda$, c) allocable to the specific ps->d(i), the resource allocation for the path ps->d(i) is abandoned, and the above process repeats for a path ps->d(i+1).

The process repeats until "i" becomes N, and if there is no allocable optical resource ($\lambda$, c) even for the path ps->d(N), it is impossible to connect the corresponding flow (s->d).

Thereafter, the allocation unit 120 allocates optical resources that meet predefined resource allocation conditions to the physical path (S180 to S190).

In this case, when optical resources allocable to a specific physical path are identified, the allocation unit 120 may calculate, according to the resource allocation conditions, the magnitude of interference of each of the optical resources allocable to the corresponding physical path due to the optical resources previously allocated to the respective links constituting the corresponding physical path and, as a result of the calculation, allocate a specific optical resource, which has the smallest magnitude of interference, to the corresponding physical path.

That is, if there are optical resources ($\lambda$, c) allocable to a specific ps->d(i), it is possible to calculate an optical resource ($\lambda^*$, $c^*$) having the smallest interference due to the optical resources ($\lambda$, c) previously allocated to the respective links constituting ps->d(i), among all the allocable optical resources ($\lambda$, c), and allocate the same to ps->d(i).

Here, the degree of interference may be calculated using a theoretical formula or may be pre-configured in the form of a table through an inter-core interference experiment depending on optical fiber characteristics.

Consequently, in the case of a method in consideration of interference between optical resources in an embodiment of the present disclosure, it is possible to reduce interference in the space division multiplexing network through a method of identifying optical resources allocable to the flow and allocating, among them, a resource having the smallest interference due to the previously assigned optical resources.

Figure 8:
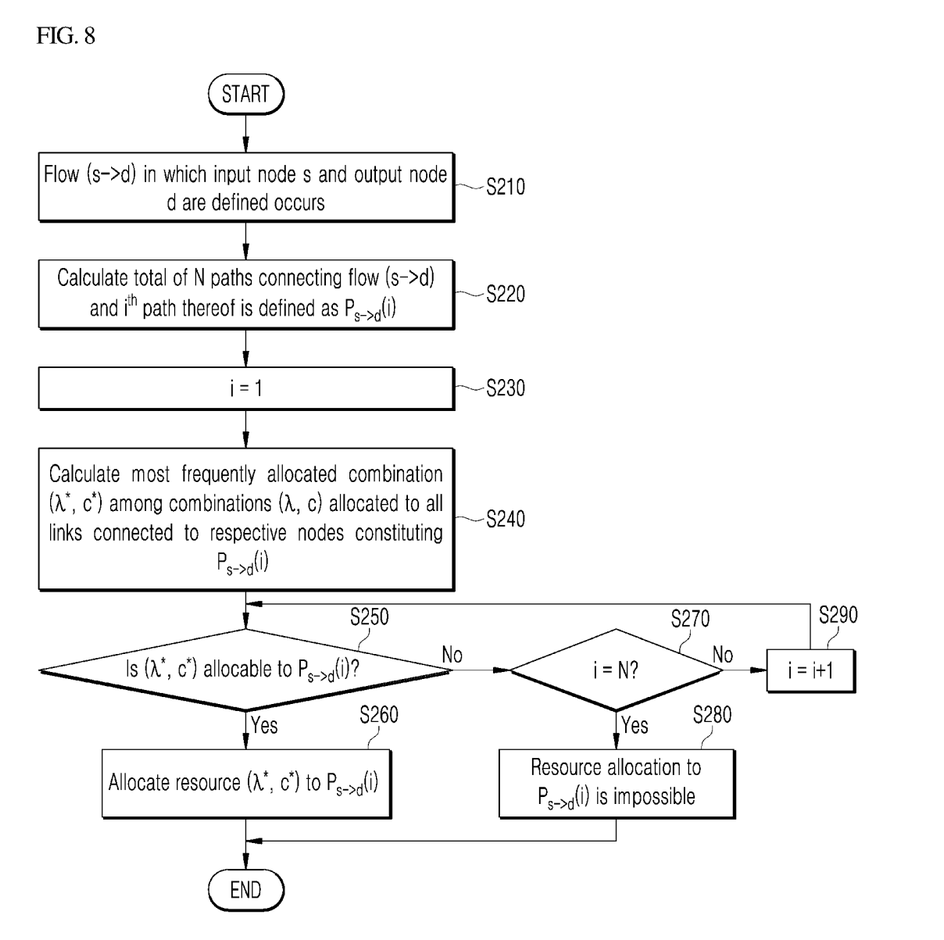

Hereinafter, an operation method of the fiber network operation apparatus 100 for considering the efficiency of an optical resource in an embodiment of the present disclosure will be described with reference to FIG. 8.

First, the determination unit 110, upon the occurrence of a flow in which an input node and an output node are defined on a space division multiplexing-based fiber network, determines a physical path supporting connection of the corresponding flow (S210 to S230).

In this case, the determination unit 110 may determine, as respective physical paths, different combinations of nodes and links between the nodes, which are capable of interconnecting an input node and an output node on the fiber network.

That is, when flow (s->d) in which an input node "s" and an output node "d" are arbitrarily defined occurs on a space division multiplexing-based fiber network, there may be multiple physical paths of the network connecting the given flow (s->d).

In this regard, in an embodiment of the present disclosure, a total of N different physical paths may be calculated, and the ith path may be defined as ps->d(i) (1≤i≤N).

Here, N may be variously determined depending on the operation of the fiber network, and in particular, since it may take much time to calculate the physical path for too large N in the case of a large sized network, an appropriate selection thereof is required.

In addition, ps->d(i) may be defined based on the priority of a shortest path using, for example, Dijkstra's shortest path algorithm in calculating the physical path.

Thereafter, when the physical path supporting the flow between the input node and the output node is determined, the allocation unit 120 allocates optical resources that meet predefined resource allocation conditions to the physical path (S240 to S260).

In this case, according to the resource allocation conditions, if there is a specific optical resource that has the highest number of allocations and is not allocated to respective links constituting the corresponding physical path, among the optical resources previously allocated to the links connected to the respective nodes on the physical path, the allocation unit 120 may allocate the specific optical resource to the physical path.

That is, identification of optical resources (λ, c) previously allocated to all links connected to the nodes constituting ps->d(i) starts from the smallest "i", thereby calculating the most frequently allocated optical resource (λ*, c*).

If the calculated optical resource (λ*, c*) is able to be allocated to the current ps->d(i), the corresponding resource is allocated.

If there are two or more physical paths, the allocation unit 120 may identify whether or not there is the specific optical resource for a specific physical path on the basis of the shortest path priority, among the two or more physical paths, and if there is no specific optical resource, the allocation unit 120 may identify whether or not there is the specific optical resource for a physical path adjacent and subsequent to the specific physical path (S280 to S290).

That is, if the calculated optical resource (λ*, c*) is previously allocated to any link in the path ps->d(i), the corresponding optical resource (λ*, c*) is unable to be allocated to ps->d(i), so the resource allocation for the path ps->d(i) is abandoned, and the above process repeats for the path corresponding to ps->d(i+1).

This process repeats until "i" becomes N, and if there is no combination (λ, c) allocable even to the path ps->d(N), it is impossible to connect the corresponding flow (s->d).

Hereinafter, in order to help the understanding of a method for considering the efficiency of an optical resource in an embodiment of the present disclosure, an example will be further described with reference to the drawings.

As shown in FIG. 5 above, it may be assumed that flow (a->d) is connected through a path "a and b to d" and has an optical resource (λ1, c1) allocated thereto, that flow (c->b) is connected through a path "c to b" and has an optical resource (λ2, c2) allocated thereto, and flow (d->f) is connected through a path "d to f" and has an optical resource (λ2, c2) allocated thereto.

In this case, if a request for connection of the flow (b->d) occurs, a total of N physical paths connecting the nodes "b" and "d" is calculated, and pb->d(1) is calculated as "b to d" when utilizing the shortest path algorithm.

Furthermore, optical resources (λ, c) previously allocated to all links connected to the nodes "b" and "d" are identified, and a most frequently used optical resource (λ*, c*) among them is calculated.

In the above example, since the optical resource (λ2, c2) is used twice and the optical resource (λ1, c1) is used once for the links connected to the nodes "b" and "d", the most frequently used optical resource (λ*, c*) is calculated as (λ2, c2).

Therefore, the flow (b->d) is connected by allocating the optical resource (λ2, c2) to the path "b to d".

Thereafter, if a request for connection of flow (c->f) occurs and the path thereof is calculated as "c, b, and d to f", the remaining optical resources, excluding (λ1, c1) and (λ2, c2), among all the optical resources, may be allocated to the corresponding path.

However, if any (λx, cy) other than the optical resource (λ2, c2) is allocated in response to the request of the flow (b->d), the optical resources allocable to the path "c, b, and d to f" of the flow (c->f) may be calculated as one of the remaining optical resources, excluding (λ1, c1), (λ2, c2), and (λx, cy).

Consequently, in the case of a method in consideration of the efficiency of optical resources in an embodiment of the present disclosure, it is possible to attain efficiency of space division multiplexing resources by ensuring a high degree of freedom for optical resources to be allocated to a new flow through a method of identifying optical resources allocable to the flow and allocating the most frequently used optical resource that is a previously assigned optical resource among them.

Figure 9:
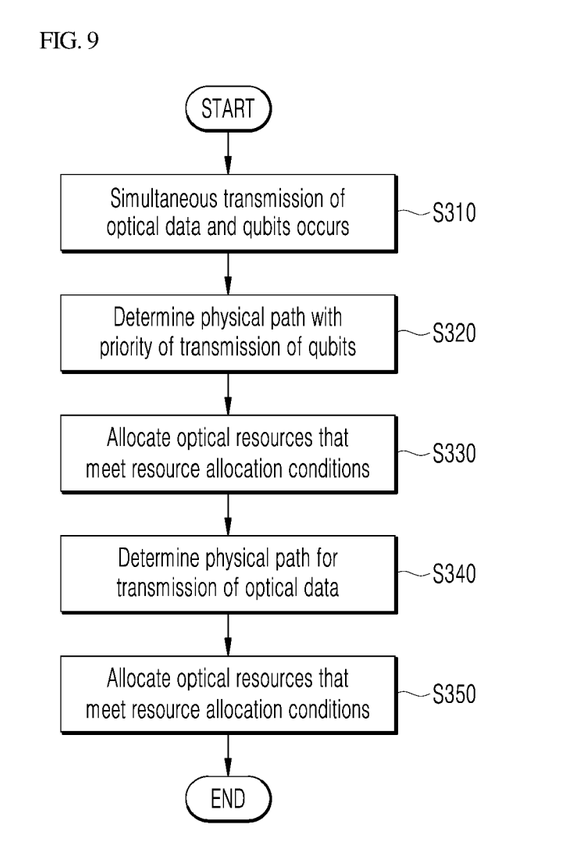

Hereinafter, an operation method of the fiber network operation apparatus 100 for considering transmission of qubits in an embodiment of the present disclosure will be described with reference to FIG. 9.

Before describing, in a space division multiplexing-based fiber network according to an embodiment of the present disclosure, it is assumed that optical data and qubits are able to be simultaneously transmitted through one optical fiber from the viewpoint of multiplexing various services requiring optical transmission.

First, upon the occurrence of flows in which an input node and an output node are defined for simultaneous transmission of optical data and qubits on the space division multiplexing-based fiber network, the determination unit 110 determines a physical path supporting connection of the corresponding flow by giving priority to the transmission of qubits (S310 to S320).

In this case, the determination unit 110 may determine, as respective physical paths for transmission of qubits, different combinations of nodes and links between the nodes, which are capable of interconnecting an input node and an output node on the fiber network.

In this regard, when a flow in which an input node and an output node are arbitrarily defined occurs on a space division multiplexing-based fiber network, there may be a plurality of physical paths of the network connecting the given flow.

The number of physical paths may be variously determined depending on the operation of the fiber network. However, if the network is large, the number of physical paths also increases according thereto, which may consume much time for calculation thereof, so an appropriate selection is required.

In addition, allocation of optical resources may be considered based on the priority of a shortest path using, for example, Dijkstra's shortest path algorithm in calculating the physical path.

Prioritizing transmission of qubits as described above when simultaneous transmission of optical data and qubits occurs in the space division multiplexing-based fiber network is due to the fact that the secret key rate (SKR) performance of quantum key distribution (QKD) utilizing qubits is greatly affected by the transmission distance of a qubit.

When a physical path supporting a flow between an input node and an output node is determined for transmission of qubits, the allocation unit 120 allocates optical resources that meet predefined resource allocation conditions to the corresponding physical path (S330).

In this case, the allocation unit 120 may allocate a specific optical resource that meets the resource allocation conditions, among the optical resources having a combination of at least some cores in which an optical amplifier is not installed among all the cores, to the corresponding physical path.

The resource allocation conditions may be understood as a criterion for minimizing the interference between optical resources and a criterion for considering the efficiency of the optical resources described above as separate embodiments.

Allocating at least some cores in which an optical amplifier is not installed in allocation of the optical resources for transmission of qubits as described above is due to the fact that the optical amplifier is unable to be used for transmission of qubits due to the non-replicable characteristic of qubits.

Thereafter, if the allocation of optical resources for transmission of qubits is completed, the determination unit 110 determines a physical path supporting the flow connection of transmission of optical data, and then if a physical path supporting the flow between the input node and the output node is determined for transmission of optical data, the allocation unit 120 allocates optical resources that meet predefined resource allocation conditions to the corresponding physical path (S340 to S350).

As a result, in a method for considering transmission of qubits in an embodiment of the present disclosure, for the case where multiplexing is required in a space division multiplexing-based fiber network due to the occurrence of simultaneous transmission of optical data and qubits, it is possible to consider a method of identifying a flow connection request list shown in FIG. 6 illustrated above, allocating optical resources by configuring the shortest path with the priority of transmission of qubits, among them, and then allocating optical resources by configuring a path for optical data.

As described above, according to the operation method of the fiber network operation apparatus 100 according to an embodiment of the present disclosure, it is possible to improve the performance of the fiber network by minimizing interference between optical resources when allocating optical resources in the space division multiplexing-based fiber network. In addition, it is possible to attain resource efficiency of the space division multiplexing network through a method that guarantees a high degree of freedom in resource allocation for future demand, among the allocable optical resources in the space division multiplexing-based fiber network, thereby reducing network costs. In addition, it is possible to expand the utility of the network by ensuring efficient transmission of qubits in consideration of the unique characteristics of simultaneous transmission of optical data and qubits in the space division multiplexing-based fiber network.

The implementations of the functional operations and subject matter described in the present disclosure may be realized by a digital electronic circuit, by the structure described in the present disclosure, and the equivalent including computer software, firmware, or hardware including, or by a combination of one or more thereof. Implementations of the subject matter described in the specification may be implemented in one or more computer program products, that is, one or more modules related to a computer program command encoded on a tangible program storage medium to control an operation of a processing system or the execution by the operation.

A computer-readable medium may be a machine-readable storage device, a machine-readable storage substrate, a memory device, or a combination of one or more thereof.

In the specification, the term "system" or "device", for example, covers a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) may be written in any form of programming language, including compiled or interpreted languages, declarative or procedural languages, and it may be deployed in any form, including as a stand-alone program or module, a component, subroutine, or another unit suitable for use in a computer environment. A computer program may, but need not, correspond to a file in a file system. A program may be stored in a single file provided to the requested program, in multiple coordinated files (for example, files that store one or more modules, sub-programs, or portions of code), or in a portion of a file that holds other programs or data (for example, one or more scripts stored in a markup language document). A computer program may be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

The implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations to the scope of any disclosure or of what may be claimed, but rather as descriptions of features that may be specific to particular embodiments of particular disclosures. Certain features that are described in the specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

In addition, in the specification, the operations are illustrated in a specific sequence in the drawings, but it should be understood that the operations are not necessarily performed in the shown specific sequence or that all shown operations are necessarily performed in order to obtain a preferable result. In a specific case, multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification do not intend to limit the present disclosure. Therefore, while the present disclosure was described in detail with reference to the above-mentioned examples, a person skilled in the art may modify, change, and transform some parts without departing a scope of the present disclosure. The scope of the present disclosure is defined by the appended claims as described below, rather than the above detailed description. Accordingly, it should be understood that all modifications or variations derived from the meaning and scope of the appended claims and equivalents thereof fall within the scope of the present disclosure.

The fiber network operation apparatus and the operation method thereof according to the present disclosure exceed the limit of the prior art in that a physical path is determined in consideration of network performance and resource efficiency in a space division multiplexing-based fiber network and optical resources are allocated according thereto, so the present disclosure sufficiently may enable sales or marketing of devices to which the present disclosure is applied, as well as utilization of the related technology, and may be practically and clearly implemented with industrial applicability.

What is claimed is:

1. A fiber network operation apparatus comprising:
    a determination unit configured to determine, for a flow in which an input node and an output node are defined and which is generated on a space division multiplexing-based fiber network, a physical path supporting connection of the flow; and
    an allocation unit configured to allocate, in relation to an optical resource that is a combination of a wavelength and a core identified to be allocable to the physical path, the optical resource to the physical path according to predefined resource allocation condition,
    wherein, when transmission of optical data and qubits is required on the space division multiplexing-based fiber network, the determination unit is configured to determine the physical path based on giving priority to transmission of qubits, and the allocation unit is configured to include, in the optical resource allocated to the physical path, a combination of at least some cores, among all cores, in which an optical amplifier is not installed.

2. The fiber network operation apparatus of claim 1, wherein:
    two or more physical paths support connection of the flow, and
    the allocation unit is configured to identify, as the physical path to which the optical resource is allocated, a specific physical path on a basis of shortest path priority from among ones of the two or more physical paths having allocable optical resources.

3. The fiber network operation apparatus of claim 1, wherein the allocation unit is configured to:
    calculate interference for each of optical resources allocable to the physical path and generated by the optical resource when previously allocated to respective links of the physical path according to the resource allocation condition, and
    allocate a specific optical resource having the smallest interference to the physical path.

4. The fiber network operation apparatus of claim 1, wherein:
    a specific optical resource has a highest number of allocations among optical resources previously allocated to links connected to respective nodes on the physical path, and is not allocated to the respective links of the physical path according to the resource allocation condition, and
    the allocation unit is configured to allocate the specific optical resource to the physical path.

5. The fiber network operation apparatus of claim 4, wherein:
    two or more physical paths support the connection of the flow, and
    the allocation unit is configured to identify, as the physical path to which the optical resource is allocated, a specific physical path on a basis of shortest path priority from among ones of the two or more physical paths associated with the specific optical resource.

6. An operation method of a fiber network operation apparatus, the method comprising:
    determining, for a flow in which an input node and an output node are defined and which is generated on a space division multiplexing-based fiber network, a physical path supporting connection of the flow; and
    in relation to an optical resource that is a combination of a wavelength and a core identified to be allocable to the physical path, allocating the optical resource to the physical path according to a predefined resource allocation condition,
    wherein, when transmission of optical data and qubits is required on the space division multiplexing-based fiber network, the physical path is determined based on giving priority to transmission of qubits, and the optical resource allocated to the physical path includes a combination of at least some cores, among all cores, in which an optical amplifier is not installed.

7. The method of claim 6, wherein:
    two or more physical paths support connection of the flow, and
    allocating the optical resource to the physical path includes identifying, as the physical path a specific physical path on a basis of a shortest path priority among ones of the two or more physical paths having allocable optical resources.

8. The method of claim 6, wherein the allocating comprises:
    calculating interference for each of optical resources allocable to the physical path and generated by the optical resources when previously allocated to respective links of the physical path according to the resource allocation condition; and
    allocating a specific optical resource having the smallest interference to the physical path.

9. The method of claim 6, wherein:
    a specific optical resource has a highest number of allocations among optical resources previously allocated to links connected to respective nodes on the physical path, and is not allocated to the respective links of the physical path according to the resource allocation condition,
    the specific optical resource is allocated to the physical path.

10. The method of claim 9, wherein:
    two or more physical paths support the connection of the flow, and a specific physical path is identified on a basis of a shortest path priority from among ones of the two or more physical paths associated with the specific optical resource.

11. A non-transitory computer-readable medium to store instructions, wherein the instructions, when implemented by a processor of a fiber network operation apparatus, cause the processor to:

determine, for a flow in which an input node and an output node are defined and which is generated on a space division multiplexing-based fiber network, physical paths supporting connection of the flow; and in relation to an optical resource that is a combination of a wavelength and a core identified to be allocable to each of the physical paths, identify a specific physical path on a basis of a shortest path priority among ones of the physical paths having allocable optical resources, and allocate the optical resource for the specific physical path according to a predefined resource allocation condition, wherein a specific optical resource has a highest number of allocations among optical resources previously allocated to links connected to respective nodes on the specific physical path, and is not allocated to the respective links of the specific physical path according to the resource allocation condition, and wherein instructions cause the processor, when allocating the optical resource to the specific physical path, to allocate the specific optical resource to the specific physical path.

12. The non-transitory computer-readable medium of claim 11, wherein the instructions cause the processor to identify the specific physical path further on a basis of a shortest path priority from among ones of the physical paths associated with the specific optical resource.

13. A non-transitory computer-readable medium to store instructions, wherein the instructions, when implemented by a processor of a fiber network operation apparatus, cause the processor to:

determine, for a flow in which an input node and an output node are defined and which is generated on a space division multiplexing-based fiber network, physical paths supporting connection of the flow; and in relation to an optical resource that is a combination of a wavelength and a core identified to be allocable to each of the physical paths, identify a specific physical path on a basis of a shortest path priority among ones of the physical paths having allocable optical resources, and allocate the optical resource for the specific physical path according to a predefined resource allocation condition, wherein, when transmission of optical data and qubits is required on the space division multiplexing-based fiber network, the instructions cause the processor to:

determine the specific physical path based on giving priority to transmission of qubits, and allocate the optical resource to the specific physical path such that the optical resource includes a combination of at least some cores, among all cores, in which an optical amplifier is not installed.

* * * * *